United States Patent [19]
Larsen

[11] Patent Number: 5,952,816
[45] Date of Patent: *Sep. 14, 1999

[54] COMPENSATION FOR POWER TRANSFER SYSTEMS USING VARIABLE ROTARY TRANSFORMER

[75] Inventor: Einar Vaughn Larsen, Charlton, N.Y.

[73] Assignee: General Electric Co., Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/967,445

[22] Filed: Nov. 11, 1997

Related U.S. Application Data

[63] Continuation-in-part of application No. 08/814,374, Mar. 11, 1997, which is a continuation-in-part of application No. 08/550,941, Oct. 31, 1995, abandoned, which is a continuation-in-part of application No. 08/426,201, Apr. 21, 1995, abandoned.

[51] Int. Cl.$^6$ ....................................................... G05F 5/04
[52] U.S. Cl. .......................................... 323/215; 323/209
[58] Field of Search .................................... 323/215, 216, 323/218, 205, 208, 209; 363/102, 105, 152, 153, 154

[56] References Cited

U.S. PATENT DOCUMENTS

| | | |
|---|---|---|
| 3,471,708 | 10/1969 | Rauhut et al. . |
| 3,617,857 | 11/1971 | Gunderson .............................. 363/133 |
| 3,694,728 | 9/1972 | Kanngiesser et al. . |
| 3,701,938 | 10/1972 | Chadwick . |
| 3,836,837 | 9/1974 | Rauhut . |
| 3,875,495 | 4/1975 | Middlebrook ............................ 363/32 |
| 3,975,646 | 8/1976 | Kilgore et al. . |
| 4,019,115 | 4/1977 | Lips . |
| 4,179,729 | 12/1979 | Stanton et al. . |
| 4,238,822 | 12/1980 | Schade . |
| 4,249,237 | 2/1981 | Ronk et al. . |
| 4,251,736 | 2/1981 | Coleman . |

(List continued on next page.)

FOREIGN PATENT DOCUMENTS

| | | |
|---|---|---|
| 2 170 686 | 10/1996 | Canada . |
| 0 739 087 | 10/1996 | European Pat. Off. . |
| 1926878 | 7/1968 | Germany . |
| 1 488 773 | 4/1969 | Germany . |
| 2062853 | 12/1970 | Germany . |
| 34 43 428 A1 | 6/1985 | Germany . |
| 1 157 885 | 7/1969 | United Kingdom . |
| 2 055 515 | 3/1981 | United Kingdom . |

OTHER PUBLICATIONS

Enrique Lopez P., et al, "Control and Planning of 50/60 Hz Industrial System Load Flows", Aug. 1990, Proceedings of the Colloquium in S. America, Argentina, Brazil, Chile, Uruguay, pp. 162–167.

Goto et al, "Power System Stabilizing Control by Adjustable Speed Pumped Storage Power Station Using Stabilizing Signals", CIGRE Symposium Tokyo 1995, pp. 1–6.

Puchstein, Lloyd, Conrad, "Alternating–Current Machines", 3rd Edition, John Wiley & Sons, Inc., NY, 1954, pp. 425–428, particularly Fig. 275 on p. 428.

(List continued on next page.)

*Primary Examiner*—Adolf Deneke Berhane
*Attorney, Agent, or Firm*—Nixon & Vanderhye

[57] ABSTRACT

In an interconnection system (100) for transferring power between a first grid (22) operating at a first electrical frequency and voltage and a second grid (24) operating at a second electrical frequency and voltage, compensation circuits including a shunt compensation circuit (40) and a series compensation circuit (50) are provided for use in conjunction with a rotary transformer (102). The shunt compensation circuit (40) regulates voltage by adjusting reactive current injected in shunt, and is preferably connected between the first grid (22) and the rotary transformer (102). The series compensation circuit (50), which regulates e.g., reactive power flow through the rotary transformer (102), is preferably connected to a transformer (30) which interfaces the first grid (22) to the rotary transformer (102).

21 Claims, 3 Drawing Sheets

U.S. PATENT DOCUMENTS

| | | |
|---|---|---|
| 4,302,716 | 11/1981 | Glavitsch et al. . |
| 4,336,488 | 6/1982 | Glavitsch et al. . |
| 4,430,574 | 2/1984 | Ogiwara . |
| 4,441,029 | 4/1984 | Kao . |
| 4,445,049 | 4/1984 | Steigerwald . |
| 4,489,261 | 12/1984 | Hartwig et al. . |
| 4,490,808 | 12/1984 | Jasmin . |
| 4,503,377 | 3/1985 | Kitabayahi et al. . |
| 4,517,471 | 5/1985 | Sachs . |
| 4,625,125 | 11/1986 | Kuwabara . |
| 4,683,718 | 8/1987 | Larsson . |
| 4,694,189 | 9/1987 | Haraguchi et al. . |
| 4,743,827 | 5/1988 | Shiozaki et al. . |
| 4,754,156 | 6/1988 | Shiozaki et al. . |
| 4,788,647 | 11/1988 | McManus et al. . |
| 4,794,544 | 12/1988 | Albright et al. . |
| 4,804,900 | 2/1989 | Soeda . |
| 4,806,781 | 2/1989 | Hochstetter . |
| 4,816,696 | 3/1989 | Sakayori et al. . |
| 4,823,018 | 4/1989 | Kuwabara et al. . |
| 4,870,558 | 9/1989 | Luce . |
| 4,920,277 | 4/1990 | Kuwabara et al. . |
| 4,922,124 | 5/1990 | Seiki et al. . |
| 4,941,079 | 7/1990 | Ooi . |
| 4,992,721 | 2/1991 | Latos . |
| 4,994,684 | 2/1991 | Lauw et al. . |
| 5,111,377 | 5/1992 | Higasa et al. . |
| 5,166,597 | 11/1992 | Larsen et al. . |
| 5,187,654 | 2/1993 | Felippe ................................. 363/154 |
| 5,239,251 | 8/1993 | Lauw . |
| 5,341,280 | 8/1994 | Divan et al. . |
| 5,343,139 | 8/1994 | Gyugyi et al. . |
| 5,402,332 | 3/1995 | Kopf . |
| 5,469,044 | 11/1995 | Gyugyi et al. . |
| 5,550,457 | 8/1996 | Kusase et al. . |

OTHER PUBLICATIONS

Kron, "Equivalent Circuits of Electric Machinery", John Wiley & Sons, Inc., NY, Chapman & Hall, Ltd., London, 1951, pp. 150–163, particularly Fig. 9.5a on p. 156.

Larsen, et al, "Specification of AC Filters for HBDC Systems", IEEE Y&D Conference, New Orleans, 1989, pp. 1–8.

"Inductrol Voltage Regulators", General Electric Company, Publication 6070, Jun. 1974, pp. 30–31.

"Magnetic Circuits and Transformers", John Wiley & Sons, Inc., New York, pp. 497–515.

"Rotary Converter", Westinghouse Electric & Manufacturing Company, Circular No. 1028, Apr. 1903.

Rauhut, "The Rotary Transformer", *Brown Boveri Review*, Sep. 1967, vol. 54, No. 9, pp. 554–564.

Rauhut et al., "Rotary Transformer Improves Interconnection", *Electrical World*, May 16, 1966, pp. 71–72.

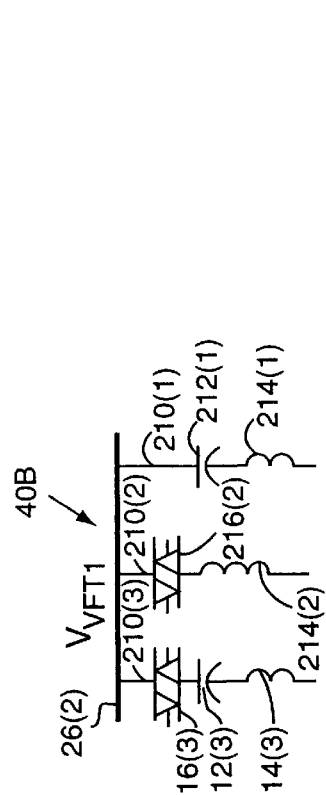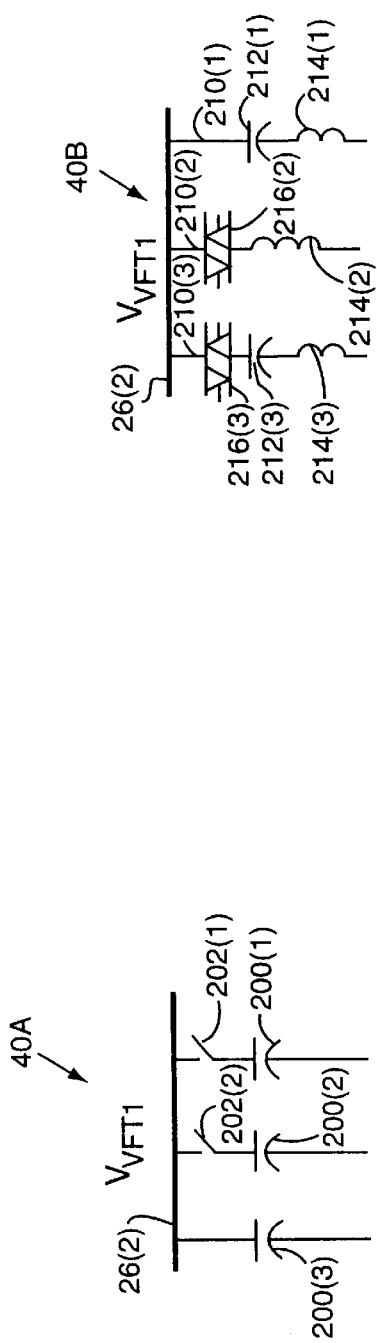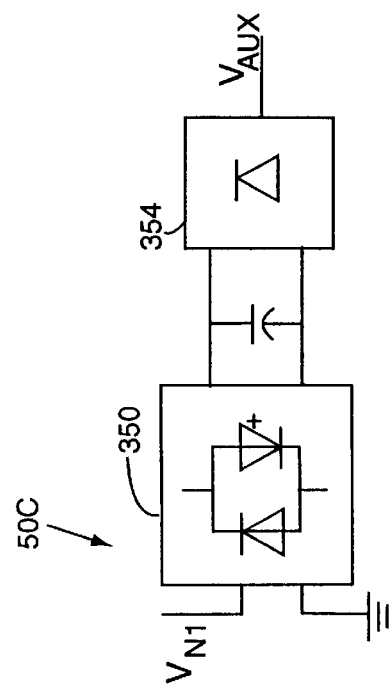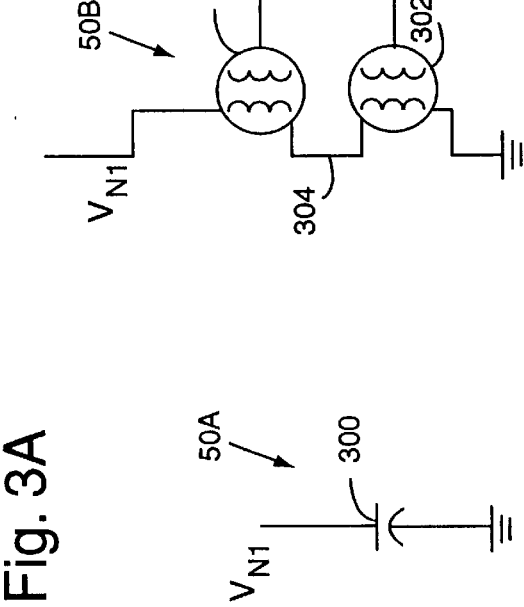
Fig. 3A
Fig. 3B
Fig. 4A
Fig. 4B
Fig. 4C

COMPENSATION FOR POWER TRANSFER SYSTEMS USING VARIABLE ROTARY TRANSFORMER

This application is related to simultaneously-filed U.S. Pat. application Ser. No. 08/967,452 (attorney docket 17GE-5721) entitled "POWER FLOW CONTROL AND POWER RECOVERY WITH ROTARY TRANSFORMER", and is a continuation-in-part of U.S. Pat. application Ser. No. 08/814,374 filed Mar. 11, 1997 by Larsen et al. and entitled "POWER FLOW CONTROL WITH ROTARY TRANSFORMERS", which in turn is a continuation-in-part of abandoned U.S. Pat. application Ser. No. 08/550,941 filed Oct. 31, 1995, abandoned, by Runkle et al. and entitled "INTERCONNECTION SYSTEM FOR TRANSFERRING POWER BETWEEN ELECTRICAL SYSTEMS", which in turn is a continuation-in-part of abandoned U.S. Pat. application Ser. No. 08/426,201 filed Apr. 21, 1995, abandoned, by Mark A. Runkle and entitled "INTERCONNECTION SYSTEM FOR ELECTRICAL SYSTEMS HAVING DIFFERING ELECTRICAL CHARACTERISTIC", all of which are incorporated herein by reference.

TECHNICAL FIELD

This invention pertains to the transmission of power between electrical systems or areas, and particularly to power flow apparatus and method for controlling the transmission of power.

BACKGROUND

There exist a number of areas in the world where interconnections between power systems require an asynchronous link. For some of these areas the power systems have different nominal frequencies (e.g., 60 Hz and 50 Hz). The prevailing technology for accomplishing an asynchronous interconnection between power systems is high voltage direct current (HVDC) conversion. HVDC conversion is complicated due e.g., to the need to closely coordinate harmonic filtering, controls, and reactive compensation. Moreover, HVDC has performance limits when the AC power system on either side has low capacity compared to the HVDC power rating. Further, HVDC undesirably requires significant space, due to the large number of high-voltage switches and filter banks.

Prior art rotary converters utilize a two-step conversion, having both a fully-rated generator and a fully-rated motor on the same shaft. Rotary converters have been utilized to convert power from AC to DC or from DC to AC. However, such rotary converters do not convert directly from AC to AC at differing frequencies. Moreover, rotary converters run continuously at one predetermined speed (at hundreds or thousands of RPMs), acting as motors that actually run themselves.

Rauhut has disclosed a rotary transformer for coupling multi-phase systems having a small frequency difference. See, for example, U.S. Pat. No. 3,471,708 to Rauhut wherein a non-synchronous rotary machine has stator windings connected to a first three-phase power system grid and rotor windings connected to a second three-power system grid. If the frequency of one system is different from that of the second system, a torque is exerted on the rotor in one direction or the other so as to cause rotation of the rotor at a rotational rate equal to the different between the network frequencies.

A closed loop angular positioning control system which operates a rotary transformer for transferring power from a first electrical system to a second electrical system is disclosed in U.S. Pat. application Ser. No. 08/825,502 filed Mar. 31, 1997 by Runkle et al. entitled "INTERCONNECTION SYSTEM FOR TRANSFERRING POWER BETWEEN ELECTRICAL SYSTEMS", which is incorporated herein by reference. Further, a power flow controller including two rotary transformers connected together and controlled to provide an effective phase shift and voltage magnitude ratio between two electrical areas is disclosed in U.S. Pat. application Ser. No. 08/814,374 filed Mar. 11, 1997 by Larsen et al. entitled "POWER FLOW CONTROL WITH ROTARY TRANSFORMERS", also incorporated herein by reference.

DISCLOSURE OF THE INVENTION

In an interconnection system for transferring power between a first grid operating at a first electrical frequency and a second grid operating at a second electrical frequency which includes a rotary transformer, compensation subsystems are provided. A shunt compensation circuit, which regulates voltage by adjusting reactive current injected in shunt into the interconnection system, is connected between the first grid and the rotary transformer. The shunt compensation system is situated on a lower voltage point at one side of the rotary transformer and provides simultaneous regulation for both sides of the rotary transformer. A series compensation circuit, which regulates e.g., reactive power flow through the rotary transformer, is preferably connected to a step-down transformer situated between the first grid and the rotary transformer.

Various embodiments of shunt compensation circuits are provided. In differing embodiments, either fixed and switched capacitors can be used, or static VAR compensation devices.

Several embodiments of series compensation circuits are also provided. In one embodiment, the series compensation circuit includes a simple capacitor. In another embodiment, the series compensation circuit includes a dual rotary phase shifting network. In yet another embodiment, the series compensation circuit includes an inverter.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A is a schematic view of a first embodiment of a shunt compensation circuit usable in the electrical power interconnection system of FIG. 1.

FIG. 3B is a schematic view of a second embodiment of a shunt compensation circuit usable in the electrical power interconnection system of FIG. 1.

FIG. 4A is a schematic view of a first embodiment of a series compensation circuit usable in the electrical power interconnection system of FIG. 1.

FIG. 4B is a schematic view of a second embodiment of a series compensation circuit usable in the electrical power interconnection system of FIG. 1.

FIG. 4C is a schematic view of a third embodiment of a series compensation circuit usable in the electrical power interconnection system of FIG. 1.

BEST MODE FOR CARRYING OUT THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
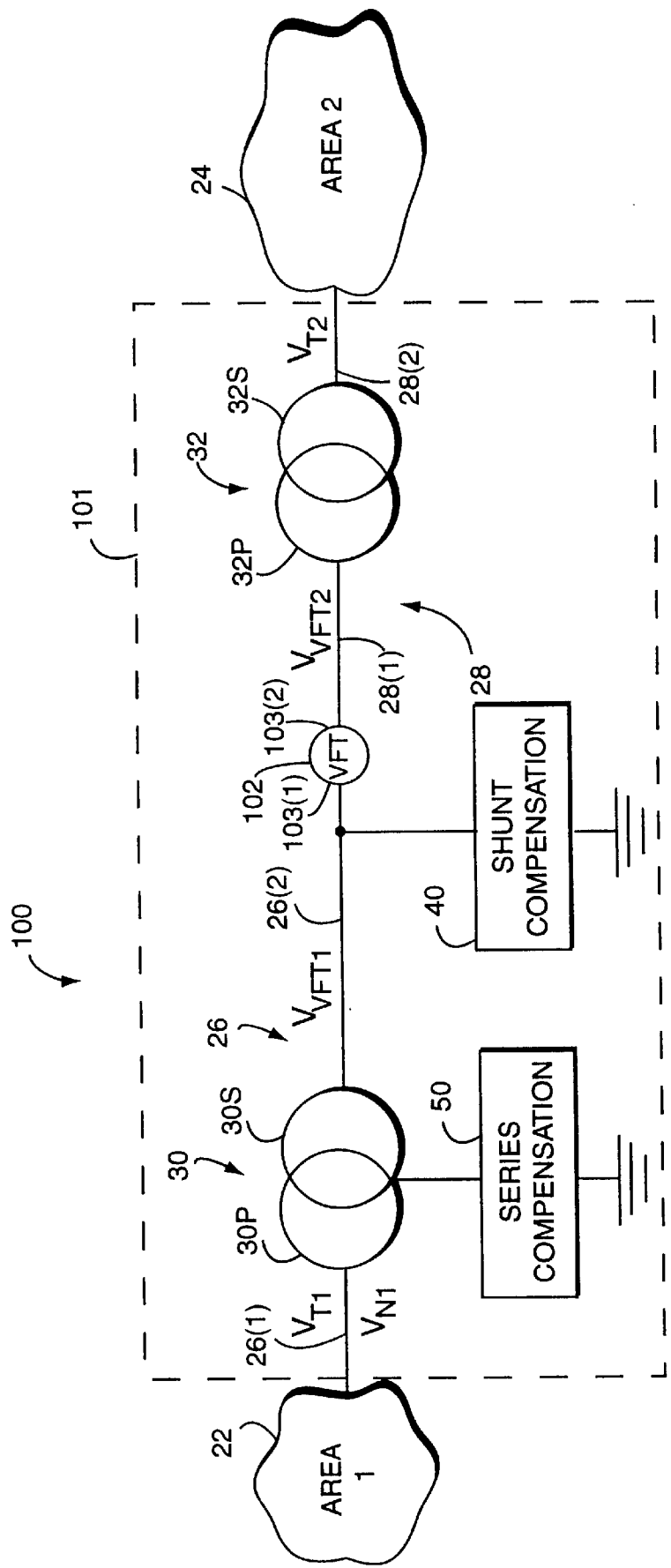
FIG. 1 is schematic view of an electrical power interconnection system according to an embodiment of the invention, showing preferred connections of a shunt compensation circuit and a series compensation circuit.

FIG. 1 shows an electrical power interconnection system 100 connected between a first grid or AC electrical power system (area 1) 22 and a second grid or electrical AC power system 24 (area 2). Power interconnection system 100 is connected to grid 22 by 3-phase line 26 and to grid 24 by 3-phase line 28. Electrical power interconnection system 100 can be situated, for example, at a substation as represented by broken line 101 shown in FIG. 1.

Power interconnection system 100 includes a rotary transformer, known herein as variable frequency transformer (VFT) 102. Step-down transformer 30 is provided on line 26, whereby a voltage $V_{T1}$ on line segment 26(1) and applied to primary coil 30P is stepped down on secondary coil 30S to voltage $V_{VFT1}$ for application on line segment 26(2) to first terminal 103(1) of variable frequency rotary transformer 102. Step-up transformer 32 is provided on line 28, whereby the voltage $V_{VFT2}$ emanating from second terminal 103(2) of variable frequency rotary transformer 102 on line 28(1) and applied to primary coil 32P is stepped up at secondary coil 32S to voltage $V_{T2}$ for application on line segment 28(2) to grid 24. In the illustrated example, step-down transformer 30 is a 100 MVA step-down (GSU) transformer, and step-up transformer 32 is a 100 MVA step-up (GSU) transformer. As just one example, the voltages mentioned above can have the following illustrative examples: $V_{T1}=230\ kV$; $V_{VTF1}=18\ kV$; $V_{TF2}=18\ kV$; and $V_{T2}=230\ kV$.

As shown in more detail below with reference to FIG. 2, at its first terminal 103(1) the variable frequency transformer 102 is connected by 3-phase lines RA, RB, RC (included in line 26) ultimately to the first AC Power system (grid 22). At its second terminal 103(2), the variable frequency transformer 102 is connected by by 3-phase lines SA, SB, and SC (included in line 28) to the second AC Power System (grid 24).

The first grid 22 and the second grid 24 may have and likely do have a differing electrical characteristic, such as differing electrical frequency. In the particular example illustrated, grid 22 operates at 60 Hz and grid 24 operates at 50 Hz. It should be understood that while these frequencies are common, the principles of the present invention can be applied when one or both of the grids 22,24 operate at other frequencies.

Power interconnection system 100 further includes both shunt compensation subsystem, also known as shunt compensation circuit 40, and series compensation subsystem, also known as series compensation circuit 50. Shunt compensation circuit 40 serves to regulate voltage in power interconnection system 100 by adjusting the reactive current injected in shunt with system 100. Differing embodiments of shunt compensation circuit 40 are hereinafter described with respect to FIG. 3A and FIG. 3B.

Series compensation circuit 50 serves to regulate reactive power flow through substation 101, or to regulate real power flow in a bandwidth faster than variable frequency transformer 102 can achieve due to inherent inertia of variable frequency transformer 102. Differing embodiments of series compensation circuit 50 are hereinafter described with respect to FIG. 4A, FIG. 4B, and FIG. 4C.

A discussion of variable frequency rotary transformer 102 now precedes elaboration of embodiments of shunt compensation circuit 40 and series compensation circuit 50. In particular, and with reference to FIG. 2, variable frequency rotary transformer 102 includes both a rotary transformer assembly 105 and a torque control unit 106 (also known as the rotor drive motor or drive motor). Rotary transformer assembly 105 includes both a rotor subassembly 110 and a stator 112. Rotor subassembly 110 includes a rotatable shaft 113, collector rings 114 (also known as slip rings). and rotor cage section 116. Three-phase lines RA, RB, RC leading from first AC Power System 22 are connected to collector rings 114; three-phase lines SA, SB, and SC leading to second AC Power System 24 are connected to stator 112.

Figure 2:
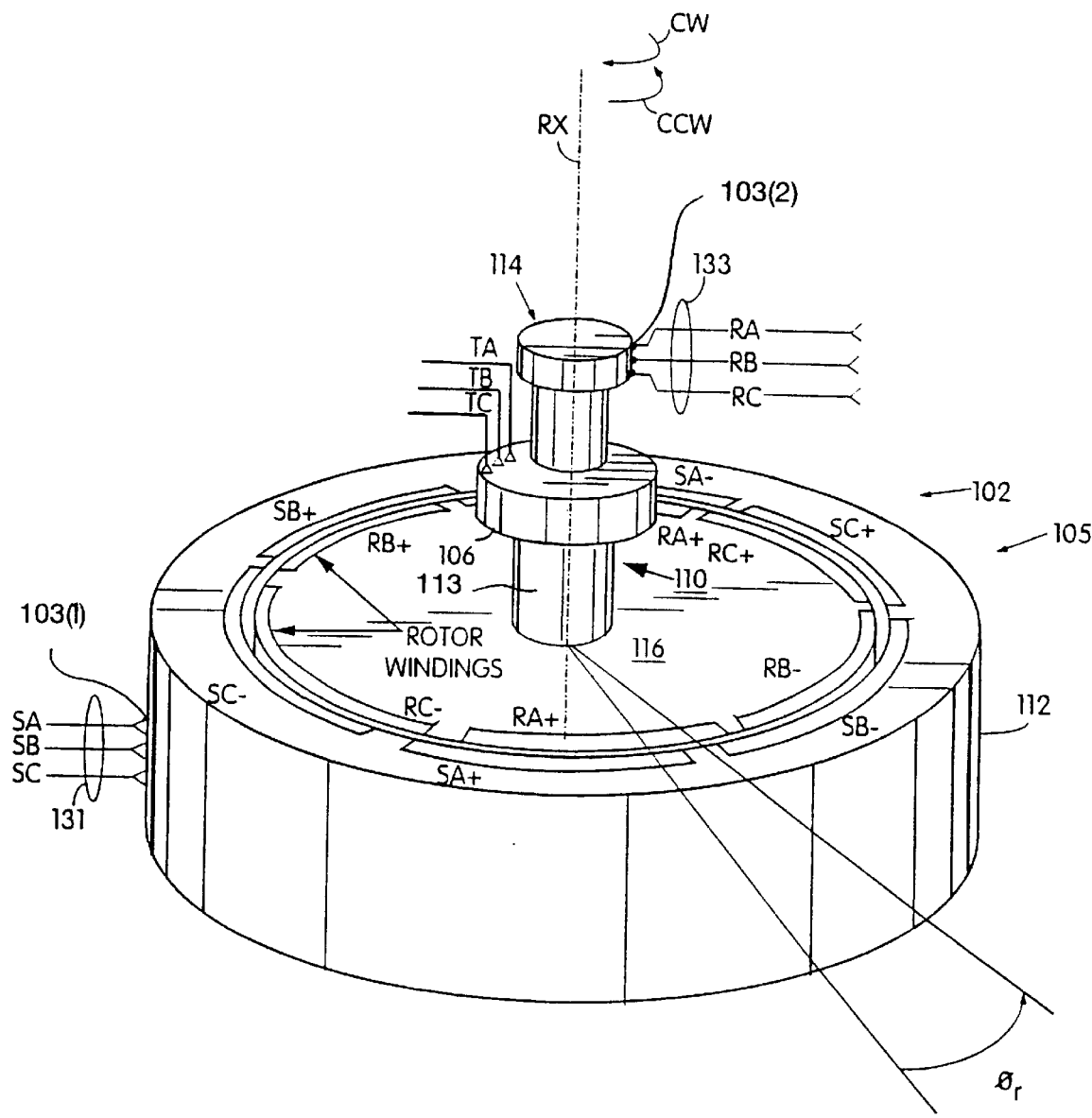
FIG. 2 is a partial schematic, partial perspective view of rotary transformer according to an embodiment of the invention.

As shown in FIG. 2 and understood by the man skilled in the art, in the illustrated embodiment rotary transformer assembly 105 is wound with sixty degree phase belts, with rotor windings being labeled as RA+, RC−, RB+, RA−, RC+, and RB− and stator windings labeled as SA+, SC−, SB+, SA−, SC+, and SB−. It should be understood that the invention is not limited to a sixty degree phase belt-wound system, rather the principles of the invention are applicable for rotary transformer assemblies of phase two and greater.

Rotor assembly 110 is rotatable about its axis RX in both clockwise direction CW and counter-clockwise direction CCW. Rotation of rotor assembly 110 is effected by rotor drive section 106, also known as the drive motor. Rotor drive section 106 is shown symbolically in FIG. 2 as a cylindrical section mounted on rotor assembly 110. Thus, rotor drive section 106 of FIG. 2 generally depicts various alternative and different types of drive mechanisms for causing rotation of rotor assembly 110. In some embodiments, rotor drive section 106 includes an actuator and some type of linkage (e.g., gearing) which interfaces with rotor assembly 110. For example, in one embodiment rotor drive section 106 comprises a worm gear drive arrangement. In other embodiments, rotor drive section 106 comprises an actuator such as a stepper motor acting through a radial (e.g, spur) gear, a direct drive arrangement, a hydraulic actuator turning a gear on rotor assembly 110, or a pneumatic actuator turning a gear on rotor assembly 110. Thus, any suitable drive mechanism may be employed for rotor drive section 106. Further understanding of variable frequency rotary transformer 102 is provided by various related applications already incorporated herein by reference.

As shown in FIG. 1, shunt compensation circuit 40 is preferably connected between line segment 26(2) and ground, and is preferably situated between secondary coil 30S of step-down transformer 30 and first terminal 103(1) of variable frequency rotary transformer 102. Such being the case, a first side of shunt compensation circuit 40 has voltage $V_{VFT1}$, while a second side of shunt compensation circuit 40 is at ground.

Shunt compensation circuit 40 can include fixed and switched capacitors. For example, the illustrative embodiment of shunt compensation circuit 40A shown in FIG. 3A includes a plurality of capacitors 200(1), 200(2), and 200(3), each connected between line segment 26(2) and ground. Of these, capacitor 200(3) is a fixed capacitor and capacitors 200(1) and 200(2) are switched capacitors, as indicated by switches 202(1) and 202(2). It should be understood that a greater or lesser number of capacitors may comprise other embodiments of shunt compensation circuit 40A, and that the mixture of fixed and switched capacitances in such embodiments may vary.

Shunt compensation circuit 40 can also include static VAR compensation devices, typically in combination with capacitors and inductors. For example, FIG. 3B shows an illustrative embodiment of shunt compensation system 40B. Shunt compensation system 40B of FIG. 3B includes three lines 210(1), 210(2), and 210(3) connected in parallel between line segment 26(2) and ground. Line 210(1) includes the series connection of capacitor 212(1) and inductor 214(1). Line 210(2) includes the series connection of static VAR compensation device 216(2) and inductor 214(2). Line 210(3) includes the series connection of static VAR compensation device 216(3), capacitor 212(3), and inductor 214(3). It should be understood that a greater or lesser number of lines 210 can comprise other embodiments of shunt compensation circuit 40B, and that differing combinations of elements can be included on such lines.

Shunt compensation circuit 40 may also be located in system 100 other than as shown in FIG. 1. For example, shunt compensation circuit 40 can be connected between line segment 28(1) and ground, and situated between variable frequency rotary transformer 102 and step-up transformer 32, although such location is presently deemed less desirable. The particular positioning of shunt compensation circuit 40 as shown in FIG. 1 advantageously connects on a lower voltage point, while providing voltage regulation on lines 26 and 28 simultaneously.

As shown in FIG. 1, series compensation circuit 50 is preferably connected between primary coil 30P of step-down transformer 30 and ground. As further shown in FIG. 1, a first side of series compensation circuit 50 has voltage $V_{N1}$, a second side of compensation circuit 50 being at ground.

Series compensation circuit 50 can take various forms, three examples of which are illustrated in FIG. 4A, FIG. 4B, and FIG. 4C. FIG. 4A shows series compensation circuit 50A as comprising a capacitor 300 connected between primary coil 30P of transformer 30 and ground.

FIG. 4B shows series compensation circuit 50B as comprising two variable frequency rotary transformers 302(1) and 302(2) connected between primary coil 30P of transformer 30 and ground. The two variable frequency rotary transformers 302(1) and 302(2) have rotor windings connected together in series as indicated by line 304. The two stator windings are connected together to a source of auxiliary power. The source of auxiliary power can be taken from the terminals of variable frequency transformer 102. No real power is drawn from such source, only reactive power. The connection and cooperation of the two variable frequency rotary transformers 302(1) and 302(2) is understood with reference to U.S. Pat. application Ser. No. 08/814,374 filed Mar. 11, 1997 by Larsen et al. and entitled "POWER FLOW CONTROL WITH ROTARY TRANSFORMERS", already incorporated herein by reference.

FIG. 4C shows series compensation circuit 50C which utilizes inverter technology. In particular, series compensation circuit 50C comprises a voltage-source inverter 350 with a source converter 354, arranged in a configuration well established in the field of motor speed control systems. The source bridge serves to maintain the dc link voltage, exchanging power as needed from an auxiliary source. This auxiliary source can be drawn from the terminals of the variable frequency transformer 102.

Series compensation circuit 50 regulates reactive power flow through substation 101, and regulates real power flow in a bandwidth faster than the rotor of variable frequency transformer 102 can achieve due to its inherent inertia. Reactive flow is regulated by adjusting the magnitude of voltage on one side of variable frequency transformer 102 with respect to the other side thereof. Real power is regulated by injecting a voltage in quadrature with the transmission voltage.

Series compensation circuit 50 can, in other embodiments, be connected other than as shown in FIG. 1. For example, in an embodiment currently deemed less preferable, series compensation circuit 50 can be connected to secondary coil 30S of step-down transformer 30. However, the higher current and lower voltage encountered in such position generally adds additional complexity and costs to series compensation circuit 50.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for transferring power between a first grid and a second grid, the first grid operating at a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

a step-down transformer having a primary coil and a secondary coil, the first winding of the rotary transformer being connected to the first grid through the step-down transformer;

a series compensation circuit connected to one of the primary coil and the secondary coil of the step-down transformer.

2. The apparatus of claim 1, wherein the series compensation circuit is connected between the primary coil of the step-down transformer and ground.

3. The apparatus of claim 1, wherein the series compensation circuit comprises a capacitor connected to one of the primary coil and the secondary coil of the step-down transformer.

4. The apparatus of claim 1, wherein the series compensation circuit comprises a pair of variable frequency rotary transformers connected to one of the primary coil and the secondary coil of the step-down transformer.

5. The apparatus of claim 1, wherein the series compensation circuit comprises a voltage-source inverter with a source converter.

6. The apparatus of claim 1, further comprising a shunt compensation circuit connected to a coil of the step-down transformer.

7. The apparatus of claim 6, wherein the shunt compensation circuit is connected to a terminal of the rotary transformer.

8. The apparatus of claim 1, further comprising:

a step-up transformer connected between the rotary transformer and the second grid, and a shunt compensation circuit connected to a coil of one of the step-down transformer and the step-up transformer.

9. A system for transferring power between a first grid and a second grid, the first grid operating at a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

a step-down transformer having a primary coil and a secondary coil, the first winding of the rotary transformer being connected to the first grid through the step-down transformer;

a series compensation circuit connected to one of the primary coil and the secondary coil of the step-down transformer; and a step-up transformer connected between the rotary transformer and the second grid, and a shunt compensation circuit connected between (1) a coil of one of the step-down transformer and the step-up transformer and (2) electrical ground.

10. The apparatus of claim 9, wherein the series compensation circuit is connected to the primary coil of the step-down transformer.

11. The apparatus of claim 9, wherein the shunt compensation circuit is connected to a terminal of the rotary transformer.

12. A system for transferring power between a first grid and a second grid, the first grid operating at a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

a step-down transformer having a primary coil and a secondary coil, the first winding of the rotary transformer being connected to the first grid through the step-down transformer;

a shunt compensation circuit connected to a coil of the step-down transformer.

13. The apparatus of claim 12, wherein the shunt compensation circuit is connected to a terminal of the rotary transformer.

14. A system for transferring power between a first grid and a second grid, the first grid operating at a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

a step-down transformer having a primary coil and a secondary coil, the first winding of the rotary transformer being connected to the first grid through the step-down transformer;

a step-up transformer connected between the rotary transformer and the second grid, and a shunt compensation circuit connected to a coil of one of the step-down transformer and the step-up transformer.

15. A system for transferring power between a first grid and a second grid, the first grid operating at a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

a step-down transformer having a primary coil and a secondary coil, the first winding of the rotary transformer being connected to the first grid through the step-down transformer;

a step-up transformer connected between the rotary transformer and the second grid, and a compensation circuit connected to a coil of one of the step-down transformer and the step-up transformer.

16. The apparatus of claim 15, further comprising a series compensation circuit connected to one of a primary coil and a secondary coil of the step-down transformer.

17. The apparatus of claim 16, wherein the series compensation circuit comprises a capacitor connected to one of the primary coil and the secondary coil of the step-down transformer.

18. The apparatus of claim 16, wherein the series compensation circuit comprises a pair of variable frequency rotary transformers connected to one of the primary coil and the secondary coil of the step-down transformer.

19. The apparatus of claim 16, wherein the series compensation circuit comprises a voltage-source inverter with a source converter.

20. The apparatus of claim 15, wherein the shunt compensation circuit is connected to a coil of one of the step-down transformer and the step-up transformer.

21. A system for transferring power between a first grid and a second grid, the first grid operating at a first electrical frequency and the second grid operating at a second electrical frequency, the system comprising:

a rotary transformer having a first winding and a second winding, the rotary transformer further having a rotatable shaft and a drive motor for rotationally driving the rotatable shaft;

one of a step-down transformer and a step-up transformer connected to the rotary transformer; and a compensation circuit connected to a coil of one of the step-down transformer and the step-up transformer.

* * * * *